United States Patent
Kagan et al.

(10) Patent No.: US 7,224,669 B2
(45) Date of Patent: May 29, 2007

(54) STATIC FLOW RATE CONTROL

(75) Inventors: Michael Kagan, Zichron Yaakov (IL); Diego Crupnicoff, Haifa (IL); Ariel Shachar, Haifa (IL); Gil Stoler, Nofit (IL); Roi Rahamim, Haifa (IL)

(73) Assignee: Mellandx Technologies Ltd., Yokneam (IL)

( * ) Notice: Subject to any disclaimer, the term of this patent is extended or adjusted under 35 U.S.C. 154(b) by 977 days.

(21) Appl. No.: 10/054,148

(22) Filed: Jan. 22, 2002

(65) Prior Publication Data

US 2003/0137935 A1    Jul. 24, 2003

(51) Int. Cl.
*H04J 1/16* (2006.01)
*H04J 3/16* (2006.01)
*H04L 12/28* (2006.01)

(52) U.S. Cl. .................. 370/230; 370/328; 370/465
(58) Field of Classification Search ......... 370/229–235
See application file for complete search history.

(56) References Cited

U.S. PATENT DOCUMENTS 5,918,017 A * 6/1999 Attanasio et al. ........... 709/224
2002/0172195 A1* 11/2002 Pekkala et al. ............. 370/360

OTHER PUBLICATIONS

InfiniBand Trade Organization, InfiniBand Architecture Specification vol. 1, Release 1.0, Oct. 2000, pp. 58-69, 215-218, 365-368 (available at www.infinibandta.org).

* cited by examiner

*Primary Examiner*—Huy D. Vu
*Assistant Examiner*—Nittaya Juntima
(74) *Attorney, Agent, or Firm*—Mark M Friedman

(57) ABSTRACT

A method for static rate flow control includes receiving a sequence of data packets for transmission over a network, including at least first and second packets having a common destination address on the network, the first and second packets having respective first and second lengths, and transmitting the first packet to the destination address. Responsive to transmitting the first packet, an entry is placed in a flow control table, and a timeout period is set for the entry responsive to the first length. The second packet is transmitted only after the timeout period has expired.

8 Claims, 4 Drawing Sheets

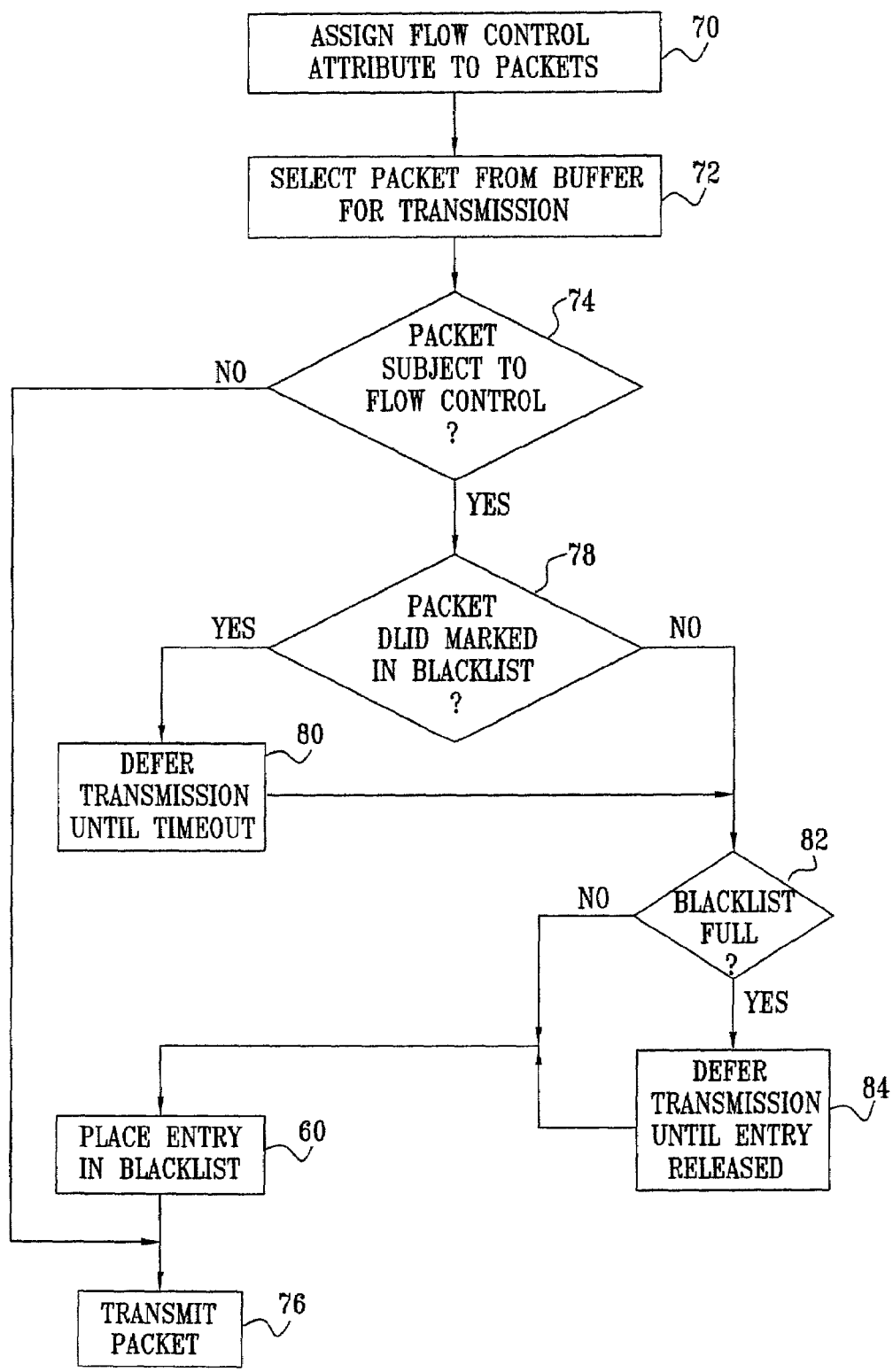

STATIC FLOW RATE CONTROL

FIELD OF THE INVENTION

The present invention relates generally to network communications, and specifically to methods for flow control over network links.

BACKGROUND OF THE INVENTION

Flow control is the management of data flow between nodes in a network so that the data can be handled at an efficient pace. As the traffic load increases in a network, resource contention increases. When too much data arrives before a device can handle it, data overflow can result, meaning the data is either lost or must be retransmitted. Under congested network conditions, flow control can help to smooth network operation, improve efficiency and effective bandwidth, and reduce average packet latency.

A variety of flow control mechanisms are known in the art, falling generally into the categories of dynamic control and static rate control. Dynamic flow control methods track network congestion in real time, and regulate the flow of data based on current congestion levels. Static rate control, on the other hand, uses pre-configured values, which are typically set by a network management entity based on known capacities of network nodes and links. Static rate control typically requires that network end-nodes keep the rates at which they transmit data into the network below certain predetermined maxima.

For example, in InfiniBand™ (IB) switch fabrics, static rate control is used to reduce congestion that is caused when a high-speed device injects packets onto a path within a subnet at a rate that exceeds the ability of the path or destination device to transfer or receive the packets. The operation of IB fabrics is described in detail in the *InfiniBand Architecture Specification*, Release 1.0 (October, 2000), which is incorporated herein by reference. This document is available from the InfiniBand Trade Association at www.infinibandta.org. Computing devices (host processors and peripherals) connect to the IB fabric via network interface adapters, which are referred to in IB parlance as channel adapters. As in other packet networks, each IB packet transmitted by a channel adapter carries a media access control (MAC) destination address, referred to as a Destination Local Identifier (also known as a Destination LID, or DLID). The LID is used by nodes in the fabric to relay the packet to its destination.

Channel adapters in IB fabrics are required to implement static rate flow control, as described in section 9.11 of the IB specification. For example, when a channel adapter with a 10 Gbps output link transmits packets to another channel adapter with a 2.5 Gbps input link through an intermediate switch, the transmitting channel adapter must not send out the packets at a rate any faster than 2.5 Gbps, in order to prevent the slower link from being overrun. Therefore, static rate limitations are imposed on channel adapter ports that are configured for injection of packets into the fabric at a rate greater than 2.5 Gbps (the minimum basic rate in IB fabrics). Such a port must not schedule a packet for injection into its local subnet until an appropriate amount of time has passed since the last packet was scheduled for injection from this source port to the same destination port.

The time that the input port must wait between packets is programmable, depending on transmission and reception rate characteristics. According to the IB specification, the time to wait between scheduling successive packets destined for the same DLID and originating from the same port is determined by the Inter Packet Delay (IPD). Specifically, if a packet b is to be sent to the same DLID and using the same source port as packet a, then packet b must not be scheduled until a tine $T_s$ has passed since packet a was scheduled. $T_s$ is calculated as (IPD+1) multiplied by the time it takes to transmit packet a. The time it takes to transmit the packet depends on the length of the packet and the port speed. The IPD value is an 8-bit integer, which is interpreted as depicted in Table I below (which is adapted from Table 63 in the IB specification):

TABLE I

| | INTER PACKET DELAY | |
|---|---|---|
| IPD | Rate | Comment |
| 0 | 100% | Suited for matched links |
| 1 | 50% | |
| 2 | 33% | Suited for 30 Gbps to 10 Gbps conversion |
| 3 | 25% | Suited for 10 Gbps to 2.5 Gbps conversion |
| 11 | 8% | Suited for a 30 Gbps to 2.5 Gbps conversion |

Although the IB specification defines the required delay to be introduced between packets for the purpose of static rate flow control, it does not suggest how such flow control should be implemented. Typically, a channel adapter is required to handle multiple transport service instances (known as queue pairs) simultaneously, each generating packets to be sent over the fabric to different DLIDs. For some of these DLIDs, flow control may be required, while for others it may not. When flow control is required, different values of the IPD may apply to different DLIDs. Even for a single DLID, the actual delay time between packets varies depending on the lengths of the packets transmitted. Under these conditions, scheduling the packets for transmission can place a heavy computational burden on the output circuits of the channel adapter, particularly when the high speed of the output port (10–30 Gbps) is considered.

SUMMARY OF THE INVENTION

It is an object of some aspects of the present invention to provide improved devices and methods for network flow control, and particularly static rate flow control.

In preferred embodiments of the present invention, a network end-node, such as a channel adapter, uses a novel table, or "blacklist," to schedule transmission of packets on links to which static rate flow control applies. When the end-node transmits a packet on a link that is subject to such flow control (which is typically identified by the destination address, or DLID, of the packet), it places an entry in the blacklist. For each such entry, the end-node sets a timer, depending on the length of the packet and a rate control factor that is applicable to the particular destination address. When the timer expires, the entry is removed from the blacklist. For each new packet that the end-node is to transmit to a flow-controlled destination address, it first checks whether there is an entry in the blacklist. If so, transmission of the new packet is delayed until the entry has timed out and been removed. When the new packet is finally transmitted, the corresponding entry is restored to the blacklist, and the timer is started again.

This table-based method is particularly suited to the type of static flow control required in IB fabrics. The timer in each case is set to the packet transmission time (dependent on the packet length and the output port rate), multiplied by the ratio of the output port rate to the receiving rate of the destination. (In the IB environment, this ratio is equal to IPD+1). The channel adapter preferably uses the same blacklist for all the DLIDs to which static flow control applies. Most preferably, however, in order to avoid using excessive memory, the size of the table is only large enough to hold a "worst-case" number of entries. This number typically corresponds to the maximum number of different DLIDs to which the channel adapter may have to apply flow control scheduling simultaneously.

On the other hand, although preferred embodiments are described herein with specific reference to IB fabrics and static flow control requirements, the principles of the present invention may similarly be applied to perform flow control functions in packet networks of other types.

There is therefore provided, in accordance with a preferred embodiment of the present invention, a method for static rate flow control, including:

receiving a sequence of data packets for transmission over a network, including at least first and second packets having a common destination address on the network, the first and second packets having respective first and second lengths;

transmitting the first packet to the destination address;

responsive to transmitting the first packet, placing an entry in a flow control table;

setting a timeout period for the entry responsive to the first length; and transmitting the second packet only after the timeout period has expired.

Preferably, setting the timeout period includes setting the period to a multiple of a time interval required to transmit the first packet, which time interval is determined responsive to the first length. Most preferably, the multiple is a number greater than one. Typically, transmitting the first and second packets includes transmitting the packets through a network port having a port transmission rate, while the network is configured to pass the packets to the destination address at a destination reception rate that is less than the port transmission rate, and the multiple is determined responsive to a relation of the port transmission rate and the destination reception rate. Preferably, the multiple is substantially equal to a ratio of the port transmission rate to the destination reception rate.

Preferably, placing the entry in the flow control table includes placing the entry corresponding to the destination address of the first packet, and the method includes removing the entry from the table upon expiration of the timeout period. Further preferably, transmitting the second packet includes checking the table with reference to the destination address of the second packet to determine whether the table contains the entry, and sending the second packet only when the entry is absent from the table. Most preferably, transmitting the second packet includes restoring the entry corresponding to the destination address to the table upon transmitting the second packet.

Preferably, placing the entry includes placing the entry corresponding to the destination address of the first packet among a plurality of entries in the table corresponding to different destination addresses in the network to which the packets in the sequence are directed. Typically, some of the destination addresses in the network are subject to static flow control, while others are not, and placing the entry includes associating an attribute with the first packet indicating whether the destination address of the first packet is subject to the static flow control, and placing the entry in the table responsive to the attribute. Most preferably, placing the entry includes writing the entry in a memory having a size determined according to a maximum number of the different destination addresses to which static flow control scheduling is likely to be applied simultaneously.

In a preferred embodiment, the network includes a switch fabric, and the destination address includes a Destination Local Identifier (DLID).

There is also provided, in accordance with a preferred embodiment of the present invention, a network end-node device, for transmitting a sequence of data packets over a network, including at least first and second packets having a common destination address on the network, the first and second packets having respective first and second lengths, the device including:

a memory, configured to hold a flow control table; and link output circuitry adapted to transmit the first packet to the destination address and, responsive to transmitting the first packet, to place an entry in the flow control table and to set a timeout period for the entry responsive to the first length, and to transmit the second packet only after the timeout period has expired.

The present invention will be more fully understood from the following detailed description of the preferred embodiments thereof, taken together with the drawings in which:

BRIEF DESCRIPTION OF THE DRAWINGS

FIG. 4 is a flow chart that schematically illustrates a method of static flow control, in accordance with a preferred embodiment of the present invention.

DETAILED DESCRIPTION OF PREFERRED EMBODIMENTS

Figure 1:
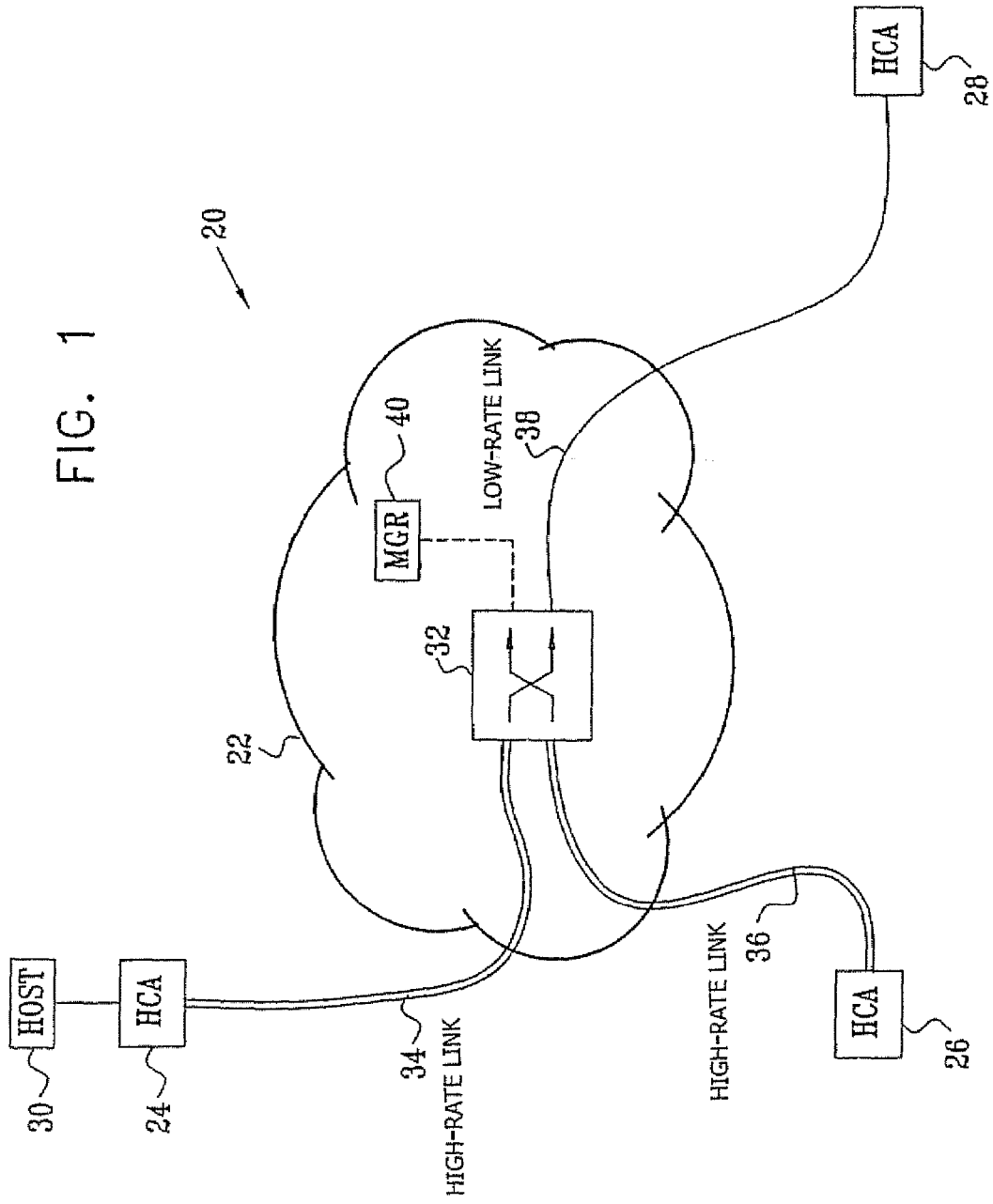
FIG. 1 is a block diagram that schematically illustrates a communication system that is subject to static flow control, in accordance with a preferred embodiment of the present invention.

FIG. 1 is a block diagram that schematically illustrates a communication system 20, in accordance with a preferred embodiment of the present invention. System 20 comprises a network 22, preferably an IB switching fabric, to which multiple channel adapters 24, 26, 28 are connected. In the present example, the channel adapters are host channel adapters (HCAs), serving host computing devices, such as a host 30. Alternatively, one or more of adapters 24, 26 and 28 may be target channel adapters, which connect peripheral devices to the fabric.

HCA 24 is coupled to a switch 32 in network 22 via a high-rate link 34, such as a 10 Gbps link in an IB fabric. HCA 24 communicates via switch 32 with HCA 26 via another high-rate link 36, and with HCA 28 via a low-rate link 38, such as a 2.5 Gbps link. Based on the mismatch in transmission rates between link 34 and link 38, a subnet manager 40 determines that static flow control must be applied to packets transmitted by HCA 24 to the DLID of HCA 28. Although for the sake of conceptual clarity, subnet manager 40 is shown in FIG. 1 as an independent entity, in practice the subnet manager is typically implemented as a software process running on network entities, such as switch 32 and HCA 24.

Figure 2:
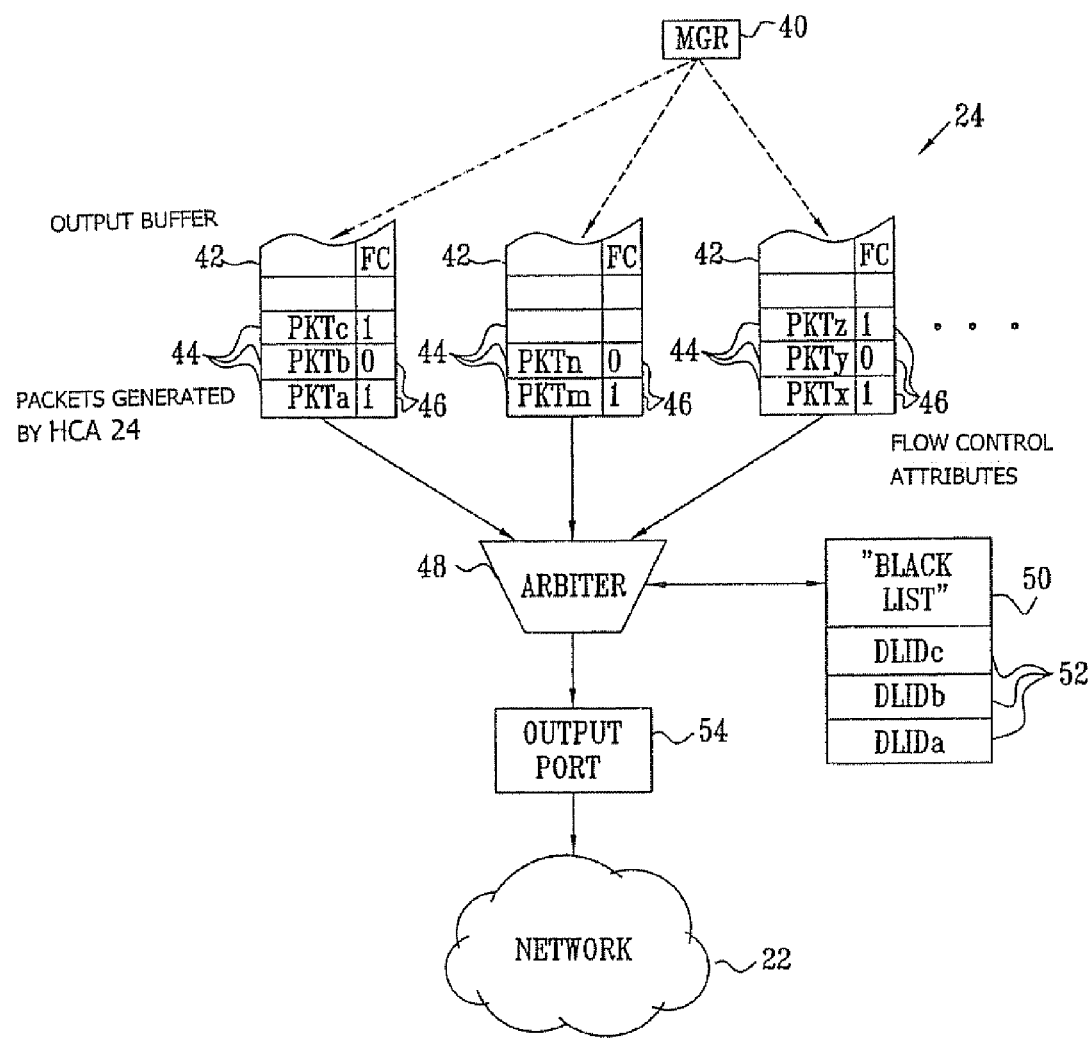
FIG. 2 is a block diagram that schematically shows details of a channel adapter, in accordance with a preferred embodiment of the present invention.

FIG. 2 is a block diagram that schematically shows details of HCA 24 that are relevant to implementation of static flow control, in accordance with a preferred embodiment of the present invention. Other elements of the HCA are omitted from the figure for the sake of simplicity, but their arrangement will be apparent to those skilled in the art. Packets 44 generated by HCA 24 for transmission over network 22 are queued in output buffers 42. Each packet has a DLID field, indicating its destination address on the network. For each DLID value, subnet manager 40 indicates whether or not flow control is required. Packets whose DLID values require flow control are preferably marked by setting a flow control attribute 46. In the embodiment shown in FIG. 2, attribute 46 is simply a single-bit flag, indicating whether or not flow control is required. Alternatively, attribute 46 may be a field that provides additional flow control information, such as the IPD that is applicable to the DLID in question.

An arbiter 48 selects the packets to be transmitted from buffers 42, based on appropriate arbitration rules, which are beyond the scope of the present invention. When flow control attribute 46 is set for a given packet, arbiter 48 checks the DLID of the packet against DLID entries 52 in a "blacklist" table 50 in a memory in HCA 24. Preferably, the memory in which table 50 is maintained is a content-addressable memory (CAM), in which the DLID itself serves as the memory address. Creation and management of the entries in table 50 are described in detail hereinbelow. As long as there is an entry pending for the DLID of the given packet, arbiter 48 delays sending the packet in order not to exceed the static rate that is permitted for the DLID. When there is no entry in table 50, or when the pending entry has expired, arbiter 48 passes the packet to an output port 54 for transmission over network 22. At the same time, the arbiter creates a new entry 52 in table 50 for use in controlling the transmission of the next packet destined for this DLID.

Figure 3A:
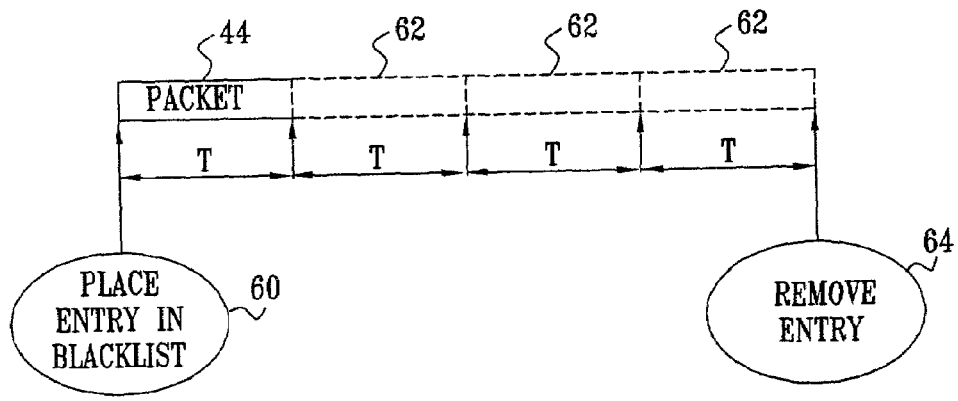
FIG. 3A is a timing diagram that schematically illustrates a method for adding entries to a flow control table and removing the entries therefrom, in accordance with a preferred embodiment of the present invention.

FIG. 3A is a timing diagram that schematically illustrates a method for placing entries 52 in table 50 and for removing the entries from the table, in accordance with a preferred embodiment of the present invention. When arbiter 48 is prepared to send a packet out to port 54, it places a DLID entry in blacklist 50, at an entry placement step 60, and sets a timer to control the expiration of the entry. The timer duration is set to a multiple N of the packet transmission time T. (In the example illustrated in the figure, N=4.) T is equal to the packet length divided by the transmission rate of output port 54. N is typically the ratio of the transmission rate of the output port to the link rate of the receiving port for this DLID. In IB terms, N=IPD+1.

Thus, after port 54 has finished transmitting a given packet 44, the timer continues to run for a further N−1 intervals 62 of duration T. At this point, the timer expires, and the DLID entry is removed from blacklist 50, at an entry removal step 64. This mechanism ensures that the delay required between packets to meet static flow control constraints is maintained.

Typically, many of the LIDs with which HCA 24 communicates are subject to flow control. Since port 54 alternates sending packets to these different DLIDs in rapid succession, blacklist 50 at any given time may contain multiple entries corresponding to the DLIDs to which it has recently sent packets. Each entry has its own timeout value, depending on the length of the packet just sent and the applicable value of the multiple N. Although it is possible to make blacklist 50 large enough to contain an entry for each DLID with which port 54 can communicate, this approach requires excessive memory. Therefore, the size of blacklist 50 is preferably only large enough to hold a "worst-case" number of entries, corresponding to the maximum number of different DLIDs that can simultaneously be in transition from entry placement step 60 to entry removal step 64 at any given time.

Figure 3B:
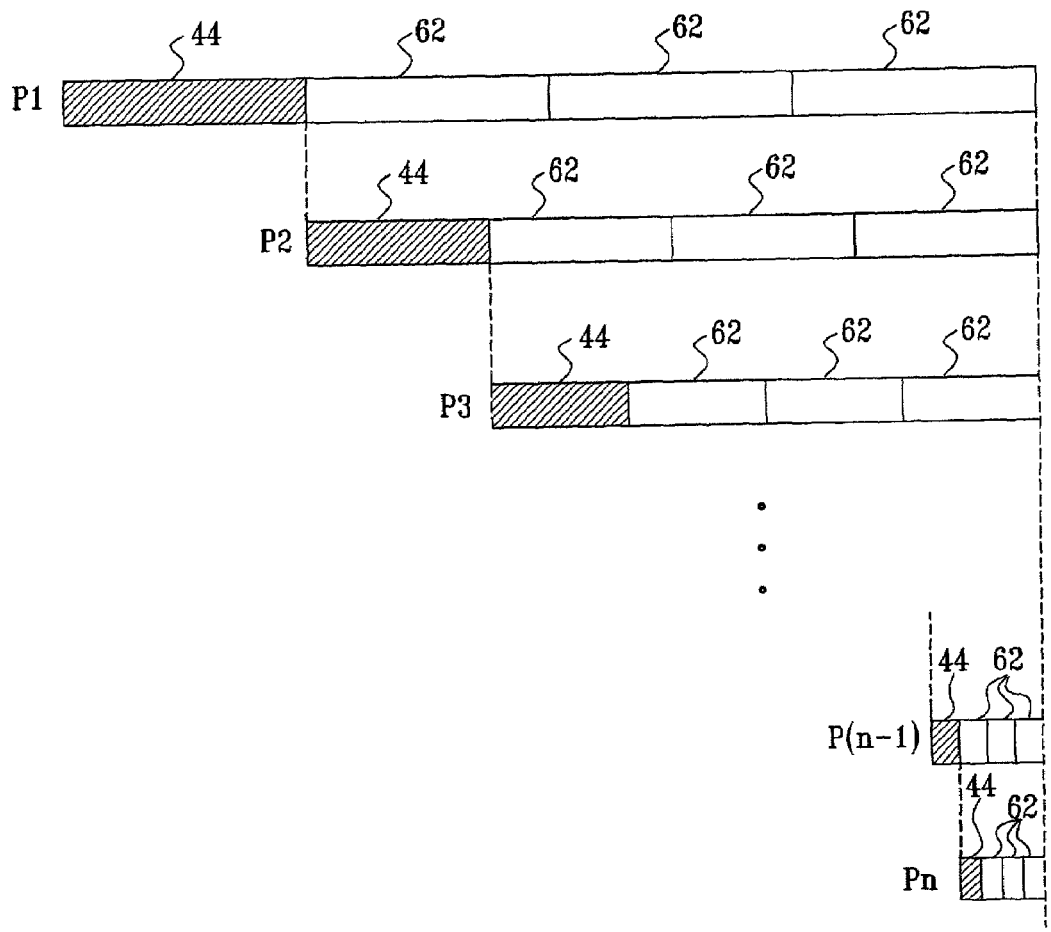
FIG. 3B is a timing diagram that schematically illustrates conditions under which a maximal number of flow control table entries are pending simultaneously.

FIG. 3B is a timing diagram that schematically illustrates worst-case loading of blacklist 50. This condition occurs, as shown in the figure, when there are as many pending entries 52 as can possibly time out simultaneously. In the present example, as in FIG. 3A, it is assumed that port 54 has a 10 Gbps output rate, so that the DLIDs that are subject to static rate flow control have IPD=3. A packet Pi is transmitted to a first flow-controlled DLID at a given starting time $T_0$. The size of P1 is S, which is assumed to be the largest possible packet size on network 22, equal to the maximum transfer unit (MTU), which is taken to be 2048 bytes, plus 128 header bytes. The DLID of P1 will remain on the blacklist for a further three intervals 62, as described above.

As soon as port 54 has finished transmitting P1, a second packet P2 is transmitted to another flow-controlled DLID, and a second entry is placed in blacklist 50. If the size of packet P2 is equal to ¾S, this second entry will time out at the same time as the first one. In like manner, when packet P3 is transmitted to a third flow-controlled DLID, its corresponding blacklist entry will time out at the same time as the preceding ones if the size of P3 is three-fourths that of P2, i.e., $(¾)^2 S$. The packet sizes continue in this succession down to the minimum packet size in network 22, which is 32 bytes. Thus, the size of the last packet Pn is $(¾)^{n-1} S \approx 32$ bytes. For the value of S given above, $(¾)^{n-1}=0.0147$, so that n≈15. On this basis, the inventors have found that a table of sixteen entries is generally sufficient to contain blacklist 50 for HCA 24 with a 10 Gbps output port rate.

FIG. 4 is a flow chart that schematically illustrates a method of static flow control carried out by arbiter 48, using the timer mechanism illustrated in FIG. 3A, in accordance with a preferred embodiment of the present invention. As packets 44 are placed in buffers 42, their DLID fields are checked to determine whether they are subject to flow control restriction. If so, their flow control attribute 46 is set, at an attribute assignment step 70. Arbiter 48 selects the packets from the buffer to be transmitted by port 54, at a packet selection step 72. In order to avoid race conditions, the arbiter first performs LID ordering arbitration, noting all pending requests to the same DLID. If there are multiple packets to transmit to the same DLID, arbiter 48 preferably allows only the first packet to proceed to port 54. The next packet on the same DLID is then allowed to proceed only after transmission of the first one is completed. In this way, two packets may be transmitted back-to-back to the same DLID, but simultaneous parallel accesses are avoided.

Upon accepting a packet for transmission, arbiter 48 checks its flow control attribute 46 to determine whether the packet is subject to flow control, at an attribute checking step 74. If not, the arbiter simply passes the packet on to port 54, at a packet transmission step 76. If the packet is subject to flow control, arbiter 48 checks the packet's DLID field against entries 52 in blacklist 50, at an entry checking step 78. If there is such an entry, arbiter 48 delays transmission of the packet until the entry has timed out and has been removed from the blacklist, at a timeout deferral step 80. Only then does the arbiter proceed with processing the packet for transmission.

After the current blacklist entry has expired at step 80, or if at step 78 the arbiter finds no entry in blacklist 50 for the DLID of the current packet, it must create a new blacklist entry prior to transmitting the packet. The arbiter checks to determine whether the blacklist has an empty slot available to accept the new entry, at a blacklist checking step 82. If the blacklist is full, transmission of the packet is delayed until one of the other entries in the blacklist times out and is removed, at a release deferral step 84. Otherwise, transmission of the next packet to this DLID could violate the applicable flow control restriction. (Preferably, as noted above, the blacklist is large enough so that arbiter 48 will nearly always pass step 82 without additional delay.) As soon as a slot is available, arbiter 48 places a new entry for this DLID in the blacklist, at entry placement step 60, and passes the packet to output port 54, at packet transmission step 76.

Although preferred embodiments are described herein with specific reference to IB fabric 22 and to static flow control requirements of the IB specification, the principles of the present invention may similarly be applied to carry out static flow control in packet networks of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for static rate flow control, comprising:
   receiving a sequence of data packets for transmission over a network, including at least first and second packets having a common destination address on the network, the first and second packets having respective first and second lengths;
   transmitting the first packet to the destination address;
   responsive to transmitting the first packet, placing an entry in a flow control table;
   setting a timeout period for the entry responsive to the first length; and
   transmitting the second packet only after the timeout period has expired;
   wherein placing the entry in the flow control table comprises placing the entry corresponding to the destination address of the first packet, and comprising removing the entry from the table upon expiration of the timeout period; and
   wherein transmitting the second packet comprises checking the table with reference to the destination address of the second packet to determine whether the table contains the entry, and sending the second packet only when the entry is absent from the table.

2. A method according to claim 1, wherein transmitting the second packet comprises restoring the entry corresponding to the destination address to the table upon transmitting the second packet.

3. A method for static rate flow control, comprising:
   receiving a sequence of data packets for transmission over a network, including at least first and second packets having a common destination address on the network, the first and second packets having respective first and second lengths;
   transmitting the first packet to the destination address;
   responsive to transmitting the first packet, placing an entry in a flow control table;
   setting a timeout period for the entry responsive to the first length; and
   transmitting the second packet only after the timeout period has expired;
   wherein placing the entry comprises placing the entry corresponding to the destination address of the first packet among a plurality of entries in the table corresponding to different destination addresses in the network to which the packets in the sequence are directed; and
   wherein some of the destination addresses in the network are subject to static flow control, while others are not, and wherein placing the entry comprises associating an attribute with the first packet indicating whether the destination address of the first packet is subject to the static flow control, and placing the entry in the table responsive to the attribute.

4. A method for static rate flow control, comprising:
   receiving a sequence of data packets for transmission over a network, including at Least first and second packets having a common destination address on the network, the first and second packets having respective first and second lengths;
   transmitting the first packet to the destination address;
   responsive to transmitting the first packet, placing an entry in a flow control table;
   setting a timeout period for the entry responsive to the first length; and
   transmitting the second packet only after the timeout period has expired;
   wherein placing the entry comprises placing the entry corresponding to the destination address of the first packet among a plurality of entries in the table corresponding to different destination addresses in the network to which the packets in the sequence are directed; and
   wherein placing the entry comprises writing the entry in a memory having a size determined according to a maximum number of the different destination addresses to which static flow control scheduling is likely to be applied simultaneously.

5. A network end-node device, for transmitting a sequence of data packets over a network, including at least first and second packets having a common destination address on the network, the first and second packets having respective first and second lengths, the device comprising:
   a memory, configured to hold a flow control table; and
   link output circuitry adapted to transmit the first packet to the destination address and, responsive to transmitting the first packet, to place an entry in the flow control table and to set a timeout period for the entry responsive to the first length, and to transmit the second packet only after the timeout period has expired;
   wherein the entry in the flow control table corresponds to the destination address of the first packet, and wherein the link output circuitry is adapted to remove the entry from the table upon expiration of the timeout period; and
   wherein the link output circuitry is adapted to check the table with reference to the destination address of the second packet to determine whether the table contains the entry, and to send the second packet only when the entry is absent from the table.

6. A device according to claim 5, wherein the link output circuitry is adapted to restore the entry corresponding to the destination address to the table upon transmitting the second packet.

7. A network end-node device, for transmitting a sequence of data packets over a network, including at least first and second packets having a common destination address on the network, the first and second packets having respective first and second lengths, the device comprising:
  a memory, configured to hold a flow control table; and
  link output circuitry adapted to transmit the first packet to the destination address and, responsive to transmitting the first packet, to place an entry in the flow control table and to set a timeout period for the entry responsive to the first length, and to transmit the second packet only after the timeout period has expired;
  wherein the link output circuitry is adapted to place a plurality of entries in the table corresponding to different destination addresses in the network to which the packets in the sequence are directed, including the entry in the flow control table corresponding to the destination address of the first packet; and
  wherein some of the destination addresses in the network are subject to static flow control, while others are not, and wherein an attribute is associated with each of the packets indicating whether the destination addresses of the packets are subject to the static flow control, and wherein the link output circuitry is adapted to place each of the entries in the table responsive to the attribute.

8. A network end-node device, for transmitting a sequence of data packets over a network, including at least first and second packets having a common destination address on the network, the first and second packets having respective first and second lengths, the device comprising:
  a memory, configured to hold a flow control table; and
  link output circuitry adapted to transmit the first packet to the destination address and, responsive to transmitting the first packet, to place an entry in the flow control table and to set a timeout period for the entry responsive to the first length, and to transmit the second packet only after the timeout period has expired;
  wherein the link output circuitry is adapted to place a plurality of entries in the table corresponding to different destination addresses in the network to which the packets in the sequence are directed, including the entry in the flow control table corresponding to the destination address of the first packet; and
  wherein the memory has a size allocated to the table that is determined according to a maximum number of the different destination addresses to which static flow control scheduling is likely to be applied simultaneously.

* * * * *